United States Patent
Schaedler et al.

(10) Patent No.: US 9,266,388 B2
(45) Date of Patent: Feb. 23, 2016

(54) NON-PNEUMATIC TIRE

(71) Applicant: MTD Products Inc, Valley City, OH (US)

(72) Inventors: Axel Schaedler, Olmsted Falls, OH (US); Ryan Cmich, Sharon Township, OH (US); Brad Pausche, Valley City, OH (US); Jimmy N. Eavenson, Sr., Aurora, OH (US)

(73) Assignee: MTD Products Inc, Valley City, OH (US)

( * ) Notice: Subject to any disclaimer, the term of this patent is extended or adjusted under 35 U.S.C. 154(b) by 184 days.

(21) Appl. No.: 14/034,608

(22) Filed: Sep. 24, 2013

(65) Prior Publication Data

US 2014/0083581 A1 Mar. 27, 2014

Related U.S. Application Data (60) Provisional application No. 61/706,188, filed on Sep. 27, 2012.

(51) Int. Cl.
   *B60B 9/04* (2006.01)
   *B60B 9/02* (2006.01)
   *B60B 9/26* (2006.01)

(52) U.S. Cl.
   CPC ... *B60B 9/02* (2013.01); *B60B 9/26* (2013.01); *B60B 2900/351* (2013.01); *B60Y 2200/22* (2013.01)

(58) Field of Classification Search
   CPC ............ B60B 9/04; B60B 9/08; B60C 11/00; B60C 27/00; B60C 5/00
   USPC ......... 152/213 A, 242, 328, 329, 246, 17, 11, 152/5, 1, 80
   See application file for complete search history.

(56) References Cited

U.S. PATENT DOCUMENTS

| | | |
|---|---|---|
| 4,867,217 A | 9/1989 | Laurent |
| 4,934,425 A | 6/1990 | Gajewski et al. |
| 4,945,962 A | 8/1990 | Pajtas |
| 5,042,544 A | 8/1991 | Dehasse |
| 5,343,916 A | 9/1994 | Duddey et al. |
| 5,743,316 A | 4/1998 | Chrobak |
| 5,979,992 A | 11/1999 | Calderone et al. |
| 6,170,544 B1 | 1/2001 | Hottebart |
| 6,279,630 B1 | 8/2001 | Ims |
| D477,273 S | 7/2003 | Christenbury et al. |
| 6,615,885 B1 | 9/2003 | Ohm |
| 7,013,939 B2 | 3/2006 | Rhyne et al. |
| 7,032,634 B2 | 4/2006 | Laurent et al. |
| 7,143,797 B2 | 12/2006 | Vannan |
| 7,650,919 B2 | 1/2010 | Rhyne et al. |
| 7,950,428 B2 | 5/2011 | Hanada et al. |

(Continued)

OTHER PUBLICATIONS

Ashley, Steven, "Rollout of Airless, Flat-Proof Tire Prototypes", Technical Innovations, Mar. 8, 2012, pp. 9-10, SAE OHE, www.offhighway-online.org.

(Continued)

*Primary Examiner* — Hau Phan
(74) *Attorney, Agent, or Firm* — Wegman, Hessler & Vanderburg (57) ABSTRACT

A non-pneumatic tire with at least one annular band having an inner ring and a deformable outer ring, a plurality of generally flexible web-spokes connecting the inner ring to the outer ring and a ground contacting tread cap affixed to the annular band.

11 Claims, 4 Drawing Sheets

(56) References Cited

U.S. PATENT DOCUMENTS

| | | | |
|---|---|---|---|
| 8,056,593 B2 | 11/2011 | Palinkas et al. | |
| 8,061,398 B2 | 11/2011 | Palinkas et al. | |
| 8,104,524 B2 | 1/2012 | Manesh et al. | |
| 8,109,308 B2 | 2/2012 | Manesh et al. | |
| 8,113,253 B2 | 2/2012 | Arakawa et al. | |
| 8,609,220 B2 * | 12/2013 | Summers et al. | 152/246 |
| 2007/0215259 A1 | 9/2007 | Burns | |
| 2008/0314486 A1 * | 12/2008 | Manesh et al. | 152/328 |
| 2009/0211674 A1 | 8/2009 | Hanada et al. | |
| 2009/0283185 A1 * | 11/2009 | Manesh et al. | 152/11 |
| 2010/0307653 A1 | 12/2010 | Delfino et al. | |
| 2011/0011506 A1 * | 1/2011 | Manesh et al. | 152/328 |
| 2011/0024008 A1 * | 2/2011 | Manesh et al. | 152/5 |
| 2011/0079335 A1 | 4/2011 | Manesh et al. | |
| 2011/0108173 A1 | 5/2011 | Abe | |
| 2011/0240189 A1 * | 10/2011 | Dutton | 152/1 |
| 2011/0240193 A1 | 10/2011 | Matsuda et al. | |
| 2012/0216932 A1 * | 8/2012 | Cron et al. | 152/246 |
| 2013/0240097 A1 * | 9/2013 | Cron et al. | 152/17 |
| 2013/0278045 A1 * | 10/2013 | Dotson et al. | 301/79 |
| 2014/0238561 A1 * | 8/2014 | Choi et al. | 152/17 |
| 2015/0017277 A1 * | 1/2015 | Anderson et al. | 425/408 |

OTHER PUBLICATIONS

Freeman Manufacturing & Supply Company, Fiberglass Tape, Jan. 21, 2014, 2 pages, https://www.freemansupply.com/FiberglassTape.htm.

* cited by examiner

NON-PNEUMATIC TIRE

FIELD OF THE INVENTION

The present invention is directed to a non-pneumatic tire, more particularly, to a non-pneumatic tire for walk-behind or riding lawn, garden, and farm equipment.

BACKGROUND OF THE INVENTION

A pneumatic, or air-filled, tire is made of an airtight inner core filled with pressurized air or nitrogen. A tread, usually reinforced with steel belting or other materials, covers this inner core and provides the contact area with the traction surface. The pressure of the air inside the tire is greater than atmospheric air pressure, so that the tire remains inflated even with the weight of a machine resting on it. The air pressure within tires provides a cushioning effect and resistance, sometimes called "air springs", to radial, lateral, and torsion forces that try to deform the tire as the tire hits bumps and holes. A puncture of a pneumatic tire could result in loss of machine traction, control, and stability.

Pneumatic tires also undergo variances in air pressure and tire performance. The pressure inside the tires maintains the radial and lateral stiffness and effective spring rate of the tires. Lower tire pressure (lower spring rate) can create improved traction and increased comfort since the tires "flatten" slightly and increase the contact with the traction surface. A lower spring rate, however, can also reduce machine stability, reduce handling capability and increase rolling resistance due to added radial and lateral deflections. Higher tire pressures (higher spring rates) can reduce rolling resistance, but traction may be reduced creating a potential loss of control.

Many machine users do not set and maintain their tire pressure properly. This may result in improper machine orientation, and spatial attitude, thereby creating situations which could result in loss of control or stability.

Pneumatic tires are also susceptible to changes in temperature, which can change the tire's internal pressure and spring rate. Over-inflation may increase the potential for a tire or wheel rim rupture. In addition, pneumatic tires are inherently plagued with variations in loaded rolling radii, and this condition is typically amplified with increased tire pressures. This variation in rolling radii creates uneven instantaneous heights (single wheel/tire) and uneven side-to-side heights (multiple wheel/tires) leading to reduced implement performance. For example, uneven side-to-side heights in a riding mower may result in uneven cuts due to an out of level cutting deck as well as operator discomfort due to vibration and bounce.

BRIEF DESCRIPTION OF THE INVENTION

The invention provides for a non-pneumatic tire and wheel configuration, herein called "non-pneumatic tire" which can improve ride characteristics and quality, while reducing the need for conventional service and maintenance. Radial, lateral, and torsion deflections may be varied and selected based on equipment type or application. The non-pneumatic tire may comprise a ground contacting tread, an annular band of web spokes, a deflection limiter, and a central hub.

Accordingly, in one embodiment, a non-pneumatic tire is disclosed wherein the tire comprises at least one annular band with an inner ring, a deformable outer ring, a plurality of generally flexible web-spokes connecting the inner ring to the outer ring and a ground contacting tread cap affixed to the annular band. In another embodiment, the non-pneumatic tire may have a deflection limiter.

In another embodiment, the non-pneumatic tire may have two annular bands. The first annular band may have a first inner face and the second annular band may have a second inner face opposing the first inner face. The deflection limiter may be sandwiched between the first inner face and the opposing second inner face.

In another embodiment, first and second annular bands may be attached via a series of fastening means. Both the first and second annular bands may have a first fastening means circumferentially spaced around their inner rings on their inner faces. Alternating between the first fastening means may be a second fastening means. The first fastening means on the first annular band interact with the second fastening means on the second annular band. Likewise, the first fastening means on the second annular band interact with the second fastening means on the first annular band such that the inner rings of both annular bands are connected together. Similarly, a third and fourth fastening means are circumferentially spaced around the outer rings of both the first and second annular bands. The third and fourth fastening means also interact with each other such that the outer rings of both annular bands are connected together.

In another embodiment, the non-pneumatic tire may further comprise a plurality of first friction attachment means that extend in an axial direction toward an outer face of the first and second annular bands. The tread cap may have an interior surface with a plurality of second friction attachments means configured to engage with the first friction attachments means, thereby affixing the tread cap to the first and second annular bands.

In yet another embodiment, the annular band comprising an inner ring, outer ring, and web-spokes may be made of polypropylene or reinforced nylon. In another embodiment, the tread cap may be made of polyurethane or polyethylene.

In another embodiment, the outer ring may be reinforced with a least one layer of a fiber cloth. The fiber cloth may be selected from the group consisting of polyester resin, vinylester resin, epoxy resin, nylon, and combinations thereof. In yet another embodiment, the fiber cloth may be a polyester resin tape.

In one embodiment, the web-spokes may have a generalized shape selected from the group consisting of "C", "Z", "S", a sideways "A", a sideways "M", a sideways "W", a sideways wishbone, and combinations thereof. In another embodiment, the web-spokes may have a sideways wishbone shape. In yet another embodiment, the web-spokes may have a double wishbone shape. Alternatively, the web-spokes may have a stiff wishbone shape approximating a sidewise "A".

In another embodiment, the non-pneumatic tire may further comprise a central hub for attaching the non-pneumatic tire to a machine axle or hub. The non-pneumatic tire may be used on a machine selected from the group consisting of tractors, utility vehicles, walk-behind lawn mowers, riding lawn mowers, tillers, cultivators, snow throwers, chipper shredders, chipper shredder vacuums, gas-powered portable DC generators, power sprayers, and power washers.

DETAILED DESCRIPTION OF EXEMPLARY EMBODIMENTS

The invention provides for a non-pneumatic tire and wheel configuration, herein called "non-pneumatic tire", which can improve ride characteristics and quality, while reducing the need for conventional service and maintenance. Radial, lateral, and torsion deflections may be varied and selected based on equipment type or application. The non-pneumatic tire may be used in on both pedestrian or "walk-behind" equipment and riding equipment, including, but not limited to, walk-behind mowers and snow blowers, riding mowers and snow blowers, lawn and garden tractors, and utility vehicles. The non-pneumatic tire may comprise a ground contacting tread, an annular band of web spokes, a deflection limiter, and a central hub.

Figures 1, 2:
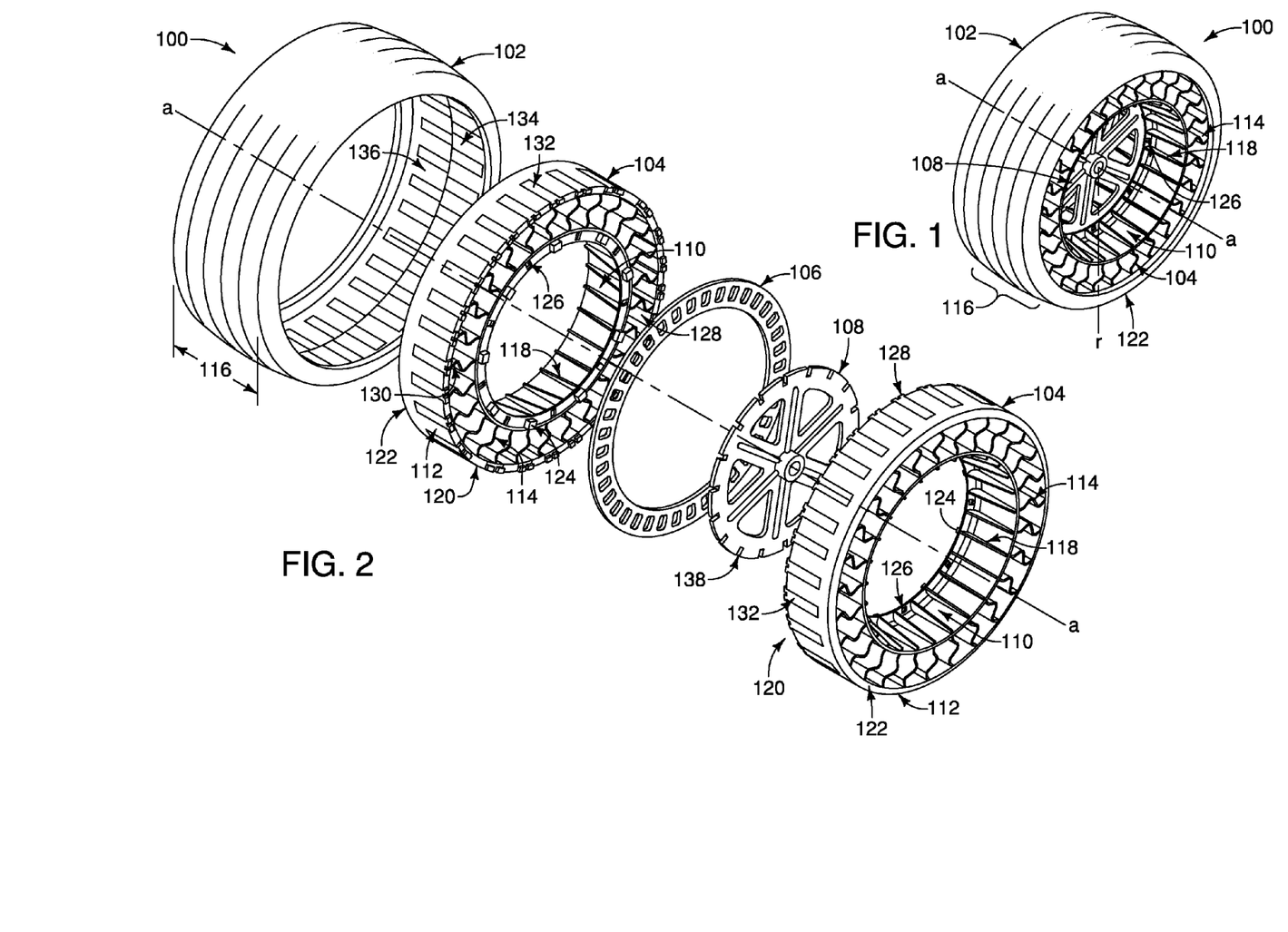
FIG. 1 is perspective view of an exemplary embodiment of the non-pneumatic tire.
FIG. 2 is an exploded view of an exemplary embodiment of the non-pneumatic tire.

FIG. 1 is a perspective view of an exemplary embodiment of the non-pneumatic tire (100). The non-pneumatic tire may comprise a ground contacting tread (102), an annular band (104) of web-spokes (114), a deflection limiter (106), and a central hub (108).

The central hub (108) may be made from metal, polymers, or composite materials that are suitable for transferring the mass of the machine from the attachment points (axles, hubs, flanges, etc.) to the annular band of web spokes. It provides a means for attaching the non-pneumatic tire to a machine axle or hub. The central hub may be connected to the annular band of web-spokes and the deflection limiter. In one embodiment, the central hub may be connected to one or more annular bands of web-spokes by means of fasteners. The central hub may be substantially rigid in regard to radial, lateral, and torsional deflections.

The tread cap (102) provides a traction surface that is radially and laterally flexible, but generally resistant to deformation in the longitudinal direction. The tread cap may be attached to the annular band (104) of web spokes by means of friction, adhesives, mechanical engagement, or fasteners. If the tread cap is attached by friction, for example, the tread cap may be heated slightly before it is placed over the annular band such that when the tread cap cools, it will shrink around the annular band, forming a tight and secure fit. The tread contact area, or footprint, may be equal to, or exceed that for a pneumatic tire under comparable loading conditions, thereby reducing ground pressure while improving traction. The tread cap (102) may be made from polymers or rubber-based materials with a tread of various designs to attain desired friction and traction coefficients. The tread cap may be replaced on the wheel assembly due to wear or damage, or the tread cap could be switched with that of other various patterns, such as to increase or reduce traction, based on application. Alternatively, the tread cap may be formed of the same material and formed together with the annular band of web spokes such that the tread and annular band are integral parts of the same piece.

An annular band (104) of web-spokes (114) may be made from polymers or composite materials that transfer the loading from the central hub to the tread, and vice-versa. The annular band of web spokes may be modified to facilitate flexing based on equipment type or application. The modifications include, but are not limited to, modifications in size, orientation, configuration, and materials of construction. The annular band of web spokes has an "inner ring" (110) that is essentially rigid, especially when attached to the central hub. The surface of the inner ring facing the axis (a) may be further reinforced using one or more ribs (118) extending in the axial direction. The "outer ring" (112) may be flexible with an effective spring rate that forces the engagement of multiple web-spokes or web-springs (114) when the wheel assembly is subjected to radial loading. The effective spring rate of the outer ring may be tailored to various applications so that multiple web springs are sharing the radial loading at all times, thereby reducing the stresses in the outer ring and web springs.

The flexing of the outer ring increases the ground contact area thereby reducing ground pressure and compaction. When the web-spokes (114) are subjected to compressive (radial) loads, such as loads from the tread areas contacting the traction surfaces and loads from the machine weight acting through the central hub, the other web-spokes are working in tension. The web-spokes in tension absorb some of the load such that the web-spokes in the compressed, or deformed, section of the tire between the central hub and the footprint region, where the tread contacts a traction surface, receive significantly reduced portions of the load.

The web-spokes may be any shape that gives a spring-like quality to the web-spokes such that they react easily to radial and torsional loading without exceeding the allowable stress levels of the web-spoke material. Any shapes that allow the web-spokes to deform when a force is applied, but will enable the web-spokes to recover to their identical shape or near to their identical shape when the force is removed are suitable. For example, the web-spokes may be configured in a generalized "C", "Z", "S", or sideways "A", "M", and "W" shape. In another embodiment, the web-spokes may be configured in a generalized wishbone shape. In addition, a single annular band may have web-spokes of more than one shape. In one embodiment, the web-spokes have a "Z" shape. The axial width of the web-spokes may be tailored based on the desired stiffness of the lateral loading. The end profiles, or interfaces of the inner and outer rings to the web-spokes may also be tailored based on the desired stiffness of the lateral loading. Accordingly, the web-spokes may be adjusted, or tuned, for various applications to enhance durability, machine stability, and control. This also allows for lateral stiffness to be higher in relation to radial stiffness than that for a pneumatic tire.

The width of the annular band in the radial direction, or the distance between the inner ring and outer ring is variable. Likewise, the width of the annular band of web spokes in the axial direction is also variable. The axial annular band width may be less than the axial width (116) of the tire tread cap, or span the entire tire tread width. The axial width of the annular band may be varied to enhance the performance in regard to torsion, lateral, and radial loading to attain minimal stress levels (and deflections) in the materials. FIG. 2 is an exploded view of an exemplary embodiment of the non-pneumatic tire, wherein the non-pneumatic tire (100) comprises multiple annular bands (104) of web spokes (114). When multiple bands are present, the diameters of the outer rings (112) of the individual bands should be the same. The widths of the individual annular bands in the axial and radial directions, however, may be different from each other.

The non-pneumatic tire may also comprise a deflection limiter (106). The deflection limiter may connect to, or be an integral part of the central hub (108). Suitable materials for the deflection limiter include, but are not limited to, metal, polymers, or composite materials. The deflection limiter serves to limit the maximum radial deflection of the tread and web-spokes. If momentary high load conditions arise, the deflection limiter may prevent tire damage from over extension or compression, whereby yielding of the spring and annular band materials could occur. It may also function as a high rate spring or jounce bumper to broaden the range for loading, thereby eliminating shock and high web spring loading and stress levels. The deflection limiter may be an integral part of the central hub. For heavy loading applications, the deflection limiter may be solid. Alternatively, the deflection limiter may have gaps or "cut-outs" in the radial direction between its inner and outer diameters as shown in FIG. 2. The cut-outs allow the deflection limiter to act as a low rate spring primarily in the radial plane. For example, the spring rate may be adjusted by changing the size and shape of holes such that it accommodates riding machine operators of various weights and sizes, from the $5^{th}$ percentile female through the $95^{th}$ percentile male. The deflection limiter may also be used to limit lateral deflection to increase machine stability and control during turning maneuvers and operation on hill sides. The deflection limiter may be located inside the non-pneumatic tire any point in the axial direction. In the exemplary embodiment shown in FIG. 2, the deflection limiter is located between two annular bands of equal widths. The diameter of the deflection limiter may vary; however, it should be limited such that the deflection limiter's outer diameter does not exceed the diameter of the annular band's outer ring (112). In one embodiment, the outer diameter of the deflection limiter is less than the diameter of the annular band's outer ring. The ratio of the outer diameter of the deflection limiter to the annular band's outer ring may vary with the load application. For example, for heavier loads, the outer diameter of the deflection limiter may be about 0% to about 5% less than the outer diameter of the annular band. For lighter load applications, the outer diameter of the deflection limiter may be about 5% to 50% less than the outer diameter of the annular band. The width (or thickness) of the deflection limiter in the axial direction may also vary.

Turning again to FIG. 2, in one embodiment, the non-pneumatic tire (100) may be comprised of two annular bands (104). The annular bands comprise multiple web-spokes (114) spaced apart from each other in the circumferential direction. The lengths of the spaces between the web-spokes in the circumferential direction may be equal or of different lengths. Each annular band comprises an inner ring (110) and an outer ring (112). The surface of the inner ring facing the axis (a) may be further reinforced using one or more ribs (118) extending in the axial direction. The ribs may be placed and spaced such that they reinforce the spaces between the web-spokes, or alternatively, the ribs may be positioned to reinforce the web-spokes as in FIG. 2.

In FIG. 2, the annular bands are placed on either side of the central hub (108). Each annular band has an inner face (120) facing the central hub. The inner faces may have a slight recess around their respective inner rings to accommodate the central hub thickness. Opposite the inner face of each annular band is an outer face (122). The outer face may be exposed or it may be covered with a material such that the web-spokes are protected from moisture, dirt, and debris. Any material is suitable, provided it does not interfere, or maintains, a desired spring rate of the non-pneumatic tire. Also between the annular bands is a deflection limiter (106). The recesses on the inner faces of the annular bands may also be constructed to accommodate the deflection limiter. The inner faces of the annular bands also have a first fastening means (124), such as grooves, clips, or snaps, protruding outwards in from the inner face in an axial direction. The first fastening means are circumferentially spaced along the annular band's inner ring (110). Circumferentially spaced between the first fastening means are a second fastening means (126), such as tongues, holes, or snaps, which interact with the first fastening means on the inner face of the annular band opposite the central hub such that the two annular bands are fastened together. Both the first and second fastening means may be placed such that they are reinforced by the ribs (118). In one embodiment, shown in FIG. 2, only the first fastening means are reinforced by the ribs.

Each annular band also has a third fastening means (128), such as grooves, clips, or snaps, protruding outwards in from the inner face in an axial direction. The third fastening means are circumferentially spaced along the annular band's outer ring (112). Circumferentially spaced between the third fastening means are a fourth fastening means (130), such as tongues, holes or snaps, which interact with the third fastening means on the inner face of the annular band opposite the central hub such that the two annular bands are fastened together.

The annular bands (104) may also have a first friction attachment means (132) in the outer ring (112) extending in an axial direction toward the outer face of the first and second annular bands. The tread cap (102) may have a second friction attachment means (134) on its interior surface (136). The second friction attachment means (134) are configured such that they engage said first friction attachment means (132) in the annular bands when the tread cap is affixed to the annular bands.

The annular band (104) may be reinforced with a fiber cloth (not shown) on the outer ring (112) to increase the tire stiffness without appreciably increasing the outer diameter of the annular band. The tread cap may then be placed on top of the reinforcing fiber cloth. Suitable materials include, but are not limited to, fiberglass made from polyester resin, vinylester resin epoxy resin, or nylon. Such materials adhere to well to the materials forming the annular ring (such as polypropylene) while conforming to and retaining the shape of the first friction attachment means (132) in the annular band. In one embodiment, the annular band may be reinforced with at least one layer of fiberglass tape.

As shown in FIG. 2, the first friction attachments means (132) in the outer ring (112) may be wedge-shaped channels. The square portion of the wedge-shaped channel may be perpendicular to the inner face (120) of the annular band such that the triangular portion extends in the axial direction toward the outer face (122). The second friction attachment means (134) on the interior surface (136) of the tread cap (102) may be wedges. The wedges are configured such that they will rest in the wedge-shaped channels in the annular bands when the tread cap is affixed to the annular bands. The wedge-shaped channels on each annular band may be configured such that when the annular bands are attached, the wedge-shaped channels are aligned. Alternatively, the wedge-shaped channels may alternate when the annular bands are attached as shown in FIG. 2.

As shown in FIG. 2, the central hub (108) may have a series of cutouts or channels (138) on its circumferential edge that interlock with the first and second fastening means (124 and 126) on the annular rings such that the annular rings are securely attached to the central hub.

In one embodiment, each annular band comprising an inner ring (110), an outer ring (112), web-spokes (114), ribs (118), a first fastening means (124), a second fastening means (126), a third fastening means (128) and a fourth fastening means (130), are all integral parts of the same piece. Multiple materials may be used to construct annular bands. Accordingly, in one embodiment, the annular bands may be molded polypropylene, and in another, reinforced nylon. The tread cap (102) comprising the tread and second friction attachment means (134) on an interior surface (136) may also be manufactured in one piece. Multiple materials are also suitable as construction materials for the tread cap. In one embodiment, the tread cap may be molded from polyurethane or polyethylene. The resulting non-pneumatic tire is 100% recyclable, made from materials with low carbon footprints, and does not require rubber-based materials.

Figure 3:
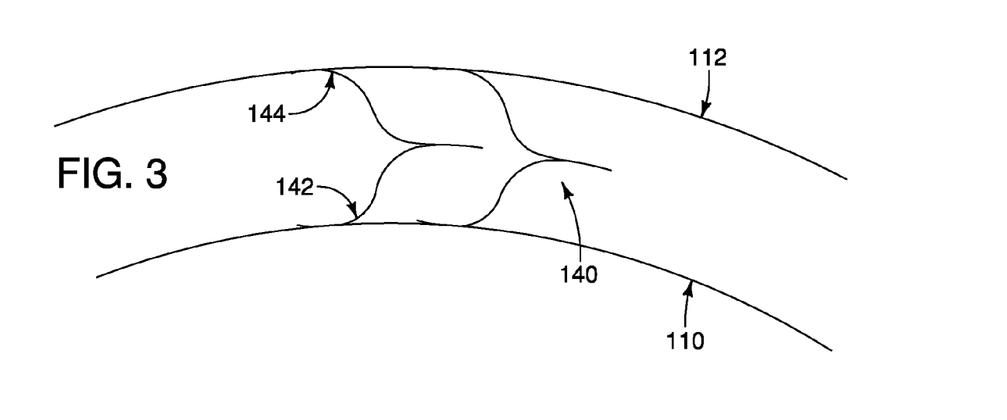
FIG. 3 shows an exemplary embodiment wherein the web-springs have a wishbone shape.
Figure 4:
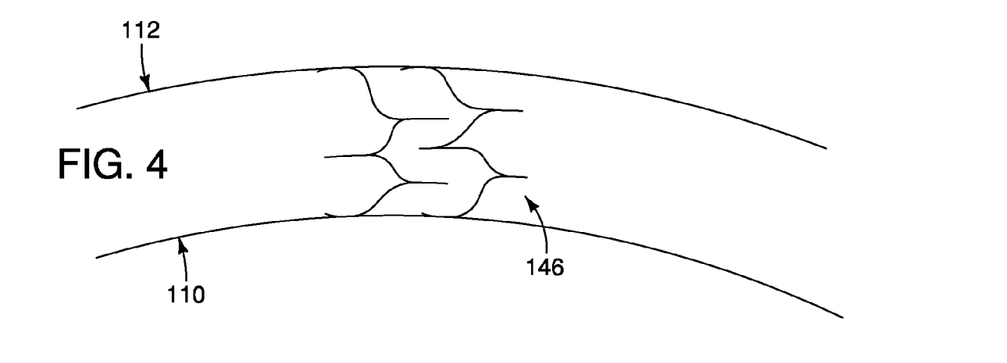
FIG. 4 shows an exemplary embodiment wherein the web-springs have a double wishbone shape.
Figure 5:
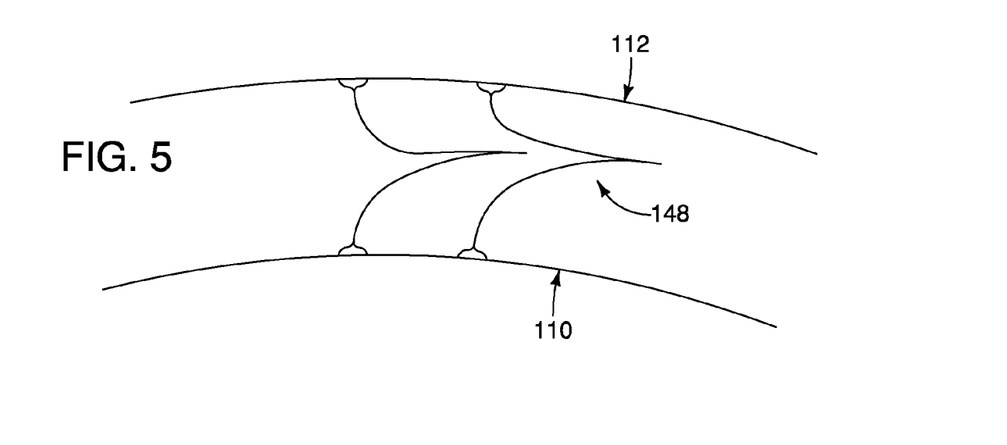
FIG. 5 shows an exemplary embodiment wherein the web-springs have a stiff wishbone shape.

FIG. 3 shows an embodiment wherein the web-spokes may be configured in a generalized wishbone shape (140), wherein a first arm (142) of the wishbone is attached to the inner ring (110) and a second arm (144) is attached to the outer ring (112). FIG. 4 shows another embodiment wherein the first or second arm of a first wishbone may be connected to a first or second arm of a second wishbone such that the two wishbones form a double wishbone (146) between the inner ring (110) and outer ring (112). FIG. 5 shows yet another embodiment— wherein the wishbone may be a "stiff wishbone" (148) with a shape approximating an "A" shape.

The non-pneumatic tire cannot be disabled by a single puncture to the tread area. In other words, the non-pneumatic tire will not go flat. The non-pneumatic tire is very robust and is highly resistant to conditions that would render a pneumatic tire inoperative. In addition, the non-pneumatic tire stiffness is independent in the radial and lateral directions, and can be adjusted, or tuned for various applications.

Unlike other applications such as automotive applications, this wheel assembly is not subject to high-speed operation. Thus, wheel balance inherent to the manufacturing processes is adequate. In addition, the non-pneumatic tire is not affected by appreciable levels of snow, mud, debris, etc. In fact, the non-pneumatic tire may incorporate a self-cleaning function as the web-springs flex and rebound.

Accordingly, in one embodiment, a non-pneumatic tire is disclosed wherein the tire comprises at least one annular band with an inner ring, a deformable outer ring, a plurality of generally flexible web-spokes connecting the inner ring to the outer ring and a ground contacting tread cap affixed to the annular band. In another embodiment, the non-pneumatic tire may have a deflection limiter.

In another embodiment, the non-pneumatic tire may have two annular bands. The first annular band may have a first inner face and the second annular band may have a second inner face opposing the first inner face. The deflection limiter may be sandwiched between the first inner face and the opposing second inner face.

In another embodiment, first and second annular bands may be attached via a series of fastening means. Both the first and second annular bands may have a first fastening means circumferentially spaced around their inner rings on their inner faces. Alternating between the first fastening means may be a second fastening means. The first fastening means on the first annular band interact with the second fastening means on the second annular band. Likewise, the first fastening means on the second annular band interact with the second fastening means on the first annular band such that the inner rings of both annular bands are connected together. Similarly, a third and fourth fastening means are circumferentially spaced around the outer rings of both the first and second annular bands. The third and fourth fastening means also interact with each other such that the outer rings of both annular bands are connected together.

In another embodiment, the non-pneumatic tire may further comprise a plurality of first friction attachment means that extend in an axial direction toward an outer face of the first and second annular bands. The tread cap may have an interior surface with a plurality of second friction attachments means configured to engage with the first friction attachments means, thereby affixing the tread cap to the first and second annular bands.

In yet another embodiment, the annular band comprising an inner ring, outer ring, and web-spokes may be made of polypropylene, or reinforced nylon. In another embodiment, the tread cap may be made of polyurethane or polyethylene.

The assembly stiffness of the non-pneumatic tire may be adjusted. If the non-pneumatic tire will be used in a walk-behind application, for example in a push-mower or snow-blower, the assembly stiffness may be about 100 lb/in ±10%. If the assembly is used in large equipment, such as a riding-mower or tractor, the assembly stiffness may be about 500 lb/in ±10%.

The assembly stiffness may be adjusted by reinforcing the outer ring with at least one layer of fiber cloth. Accordingly, in another embodiment, the outer ring may be reinforced with a least one layer of a fiber cloth. The fiber cloth may be selected from the group consisting of polyester resin, vinylester resin, epoxy resin, nylon, and combinations thereof. In yet another embodiment, the fiber cloth may be a polyester resin (fiberglass) tape. Generally, the fabric reinforced stiffness depends on the type of fiber cloth and resin used and the number of layers of cloth. When a polyester resin tape is used, the assembly stiffness increases exponentially with the number of layers used. The number of layers may vary with the desired assembly stiffness. Again, the assembly stiffness may vary depending on the type of application, such as push mower or riding-mower applications. More layers may be used in applications that require as larger assembly stiffness. In one embodiment, the number of layers of fiber cloth may range from 1 to about 20. In another embodiment, the number of layers may range from 1 to about 10. In yet another embodiment, the number of layers may range from 3 to about 4. An exemplary non-pneumatic tire may have an annular band (104) reinforced with 3 to 4 layers of 4 inch-wide by 0.11 inch-thick fiberglass tape (such as tape available from Freeman Manufacturing Supply Co., Avon, Ohio).

In one embodiment, the web-spokes may have a generalized shape selected from the group consisting of "C", "Z", "S", a sideways "A", a sideways "M", a sideways "W", a sideways wishbone, and combinations thereof. In another embodiment, the web-spokes may have a sideways wishbone shape. In yet another embodiment, the web-spokes may have a double wishbone shape. Alternatively, the web-spokes may have a stiff wishbone shape approximating a sidewise "A".

In another embodiment, the non-pneumatic tire may further comprise a central hub for attaching the non-pneumatic tire to a machine axle or hub. The non-pneumatic tire may be used on a machine selected from the group consisting of tractors, utility vehicles, walk-behind lawn mowers, riding lawn mowers, tillers, cultivators, snow throwers, chipper shredders, chipper shredder vacuums, gas-powered portable DC generators, power sprayers, and power washers.

EXAMPLES

The assembly stiffness of a non-pneumatic tire wherein the webspokes have generally "Z"-shaped web springs. ("Example 1") was tested and compared to pneumatic tires ("Comparative Example 1" and "Comparative Example 2"). To measure the assembly stiffness, weights in about 10-lb increments up to 200 lbs. were added at the axis of the central hub. The deflection of the rolling radius was measured at each load. The rolling radius is the radius from the center of the tire axis to the ground. As a load is applied to the central hub, the rolling radius decreases. This decrease in the rolling radius is known as deflection. Stiffer tires will deflect less.

Figure 6:
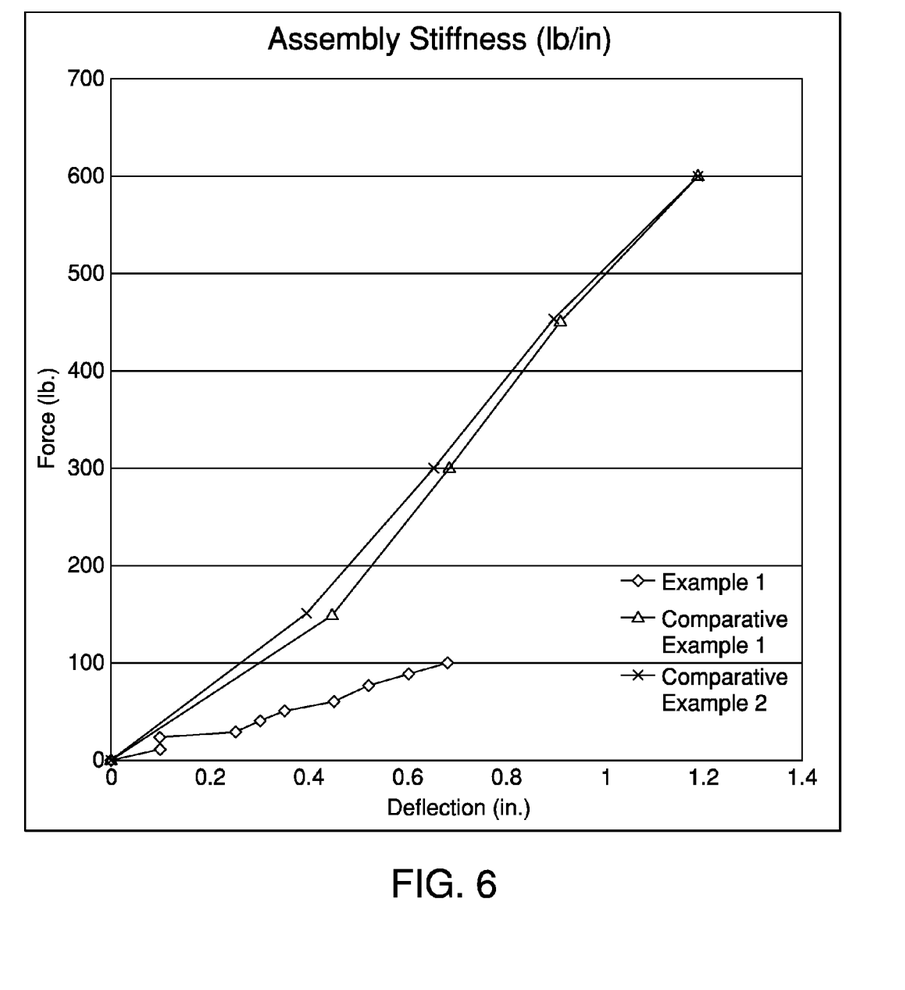
FIG. 6 is a graph showing assembly stiffness of a non-pneumatic tire as compared to a pneumatic tire.

For the Comparative Examples, the weights were applied to a lawn and garden tractor with pneumatic tires, the tire deflection was measured, and the assembly stiffness was calculated. For Example 1, non-pneumatic tires were placed on the lawn and garden tractor and the same steps were repeated. The assembly stiffness for both the Comparative Examples and Example 1 are shown in the graph in FIG. 6.

Figure 7:
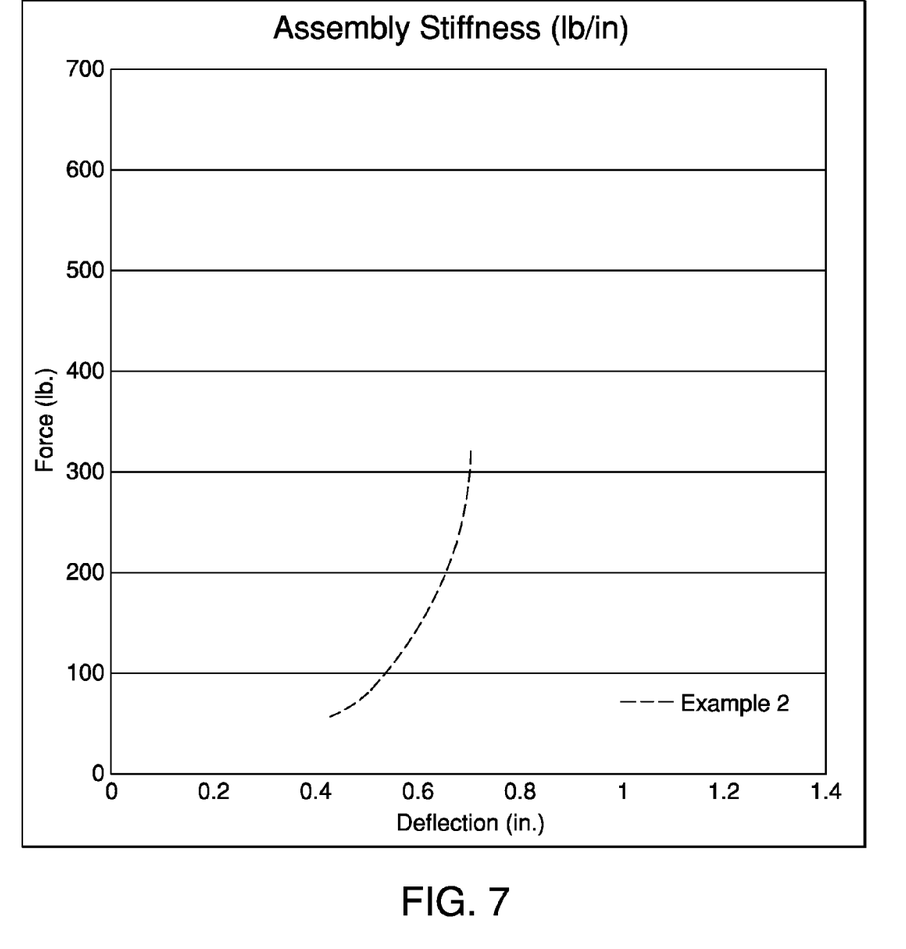
FIG. 7 is a graph including the estimated assembly stiffness of a non-pneumatic tire wherein the non-pneumatic tire has wishbone-shaped web-springs.

For Example 2, the assembly stiffness for a non-pneumatic tire with wishbone-shaped web springs was estimated using finite element analysis. The results are shown in the graph in FIG. 7.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-pneumatic tire comprising:
   a deflection limiter;
   a first annular band having a first inner face;
   a second annular band having a second inner face opposing said first inner face, wherein said deflection limiter is sandwiched between said first inner face and said opposing second inner face, wherein said annular bands have an inner ring and a deformable outer ring;
   a plurality of generally flexible web-spokes connecting said inner ring to said outer ring; and
   a ground contacting tread cap affixed to said annular bands, wherein said first and second annular bands further comprise:
   a first fastening means circumferentially spaced around said inner ring on said inner face of said first and second annular bands;
   a second fastening means circumferentially spaced around said inner ring on said inner face of said first and second annular bands and between said first fastening means, wherein said first fastening means on said first annular band interact with said second fastening means on said second annular band, and wherein said first fastening means on said second annular band interact with said second fastening means on said first annular band to connect said inner rings of said first and second annular bands together;
   a third fastening means circumferentially spaced around said outer ring on said inner face of said first and second annular bands; and
   a fourth fastening means circumferentially spaced around said outer ring on said inner face of said first and second annular bands and between said third fastening means, and wherein said third fastening means on said first annular band interact with said fourth fastening means on said second annular band and wherein said first fastening means on said second annular band interact with said second fastening means on said first annular band to connect said outer rings of said first and second annular bands together.

2. The non-pneumatic tire of claim 1, wherein said first and second annular bands further comprise;
   a plurality of first friction attachment means in a surface of said outer ring, wherein said first friction attachments means extend in an axial direction toward an outer face of said first and second annular bands; and
   wherein said tread cap having an interior surface further comprises;
   a plurality of second friction attachment means on said interior surface, wherein said second friction attachments means are configured to engage said first friction attachment means on said first and second annular bands, thereby affixing said tread cap to said first and second annular bands.

3. The non-pneumatic tire of claim 1, wherein said inner ring, outer ring, and web-spokes of said annular band are made of polypropylene or reinforced nylon.

4. The non-pneumatic tire of claim 1, wherein said tread cap is made of polyurethane or polyethylene.

5. The non-pneumatic tire of claim 1, wherein said web-spokes have a generalized shape selected from the group consisting of "C", "Z", "S", a sideways "A", a sideways "M", a sideways "W", a sideways wishbone, and combinations thereof.

6. The non-pneumatic tire of claim 5, wherein said web-spokes have a sideways wishbone shape.

7. The non-pneumatic tire of claim 6, wherein said web-spokes have a double wishbone shape.

8. The non-pneumatic tire of claim 6, wherein said web-spokes have a stiff wishbone shape approximating a sidewise "A".

9. The non-pneumatic tire of claim 1, further comprising central hub for attaching said non-pneumatic tire to a machine axle or hub.

10. The non-pneumatic tire of claim 1, wherein said non-pneumatic tire is used on a machine selected from the group consisting of tractors, utility vehicles, walk-behind lawn mowers, riding lawn mowers, tillers, cultivators, snow throwers, chipper shredders, chipper shredder vacuums, gas-powered portable DC generators, power sprayers, and power washers.

11. A non-pneumatic tire comprising:
   a deflection limiter;
   a first annular band having a first inner face;
   a second annular band having a second inner face opposing said first inner face, wherein said deflection limiter is sandwiched between said first inner face and said opposing second inner face, wherein said annular bands include an inner ring and a deformable outer ring;
   a plurality of generally flexible web-spokes connecting said inner ring to said outer ring; and
   a ground contacting tread cap affixed to said annular band.

* * * * *